US007314162B2

(12) United States Patent  (10) Patent No.: US 7,314,162 B2
Carr et al.  (45) Date of Patent: Jan. 1, 2008

(54) METHOD AND SYSTEM FOR REPORTING IDENTITY DOCUMENT USAGE

(75) Inventors: J. Scott Carr, Tualatin, OR (US); Bruce L. Davis, Lake Oswego, OR (US)

(73) Assignee: Digimore Corporation, Beaverton, OR (US)

( * ) Notice: Subject to any disclaimer, the term of this patent is extended or adjusted under 35 U.S.C. 154(b) by 304 days.

(21) Appl. No.: 10/979,770

(22) Filed: Nov. 1, 2004

(65) Prior Publication Data

US 2007/0205266 A1 Sep. 6, 2007

Related U.S. Application Data

(63) Continuation-in-part of application No. 10/965,232, filed on Oct. 13, 2004.

(60) Provisional application No. 60/516,581, filed on Oct. 30, 2003, provisional application No. 60/512,033, filed on Oct. 17, 2003.

(51) Int. Cl.
G07F 19/00 (2006.01)
(52) U.S. Cl. .................................... 235/379
(58) Field of Classification Search ............... 235/379
See application file for complete search history.

(56) References Cited

U.S. PATENT DOCUMENTS

2002/0124024 A1 9/2002 Patterson et al.
2003/0150907 A1* 8/2003 Metcalf et al. ............ 235/375
2004/0024693 A1 2/2004 Lawrence
2004/0083169 A1 4/2004 Dentler et al.
2004/0129787 A1 7/2004 Saito et al.
2004/0153663 A1 8/2004 Clark et al.
2004/0230527 A1 11/2004 Hansen et al.
2005/0043961 A1 2/2005 Torres et al.

FOREIGN PATENT DOCUMENTS

WO WO03/071396 8/2003

OTHER PUBLICATIONS

"Acxiom Patriot Act Solutions," Oct. 2002, 9 pp.
Norman et al, "Peronicx Methodology," Acxiom Corporation, Jan. 2003, 14 pp.

* cited by examiner

Primary Examiner—Karl D. Frech

(57) ABSTRACT

To more rapidly redress identity theft, reports are issued to a person detailing instances in which that person's driver's license, passport, or other government-issued identification documents are presented as a form of ID. These reports can be issued periodically (e.g., integrated with monthly reports aggregating bank and brokerage account information, of the sort provided by Yahoo! and Microsoft Money software), or can be issued by email or text messaging, etc., each time an ID presentment is reported. Upon receiving a report of unfamiliar ID usage (e.g., a report that a driver's license was presented as evidence of age to purchase alcohol in a remote state), the person can take early action to redress apparent identity theft.

18 Claims, 4 Drawing Sheets

SUMMARY REPORT FOR JUNE, 2004
For John Q. Public

Fidelity Investments
June 4, 2004    Purchased 100 DMRC @ $11.25 ea    $1,125.00
June 30, 2004    Month end account value    $276,946.44

Bank of America
Mortgage
June 15, 2004    Payment received    $1,175.00
June 30, 2004    Balance owing    $138,733.93

Savings
June 30, 2004    Interest    $10.44
June 30, 2004    Month end account value    $12,355.22

Identity Document Usage
June 11, 2004    Maryland driver license xxxx4779 presented at United check-in, desk 14, Portland International Airport, 1:53 p.m.
June 11, 2004    U.S. Passport xxxxxxxxxx3412 presented at United check-in, desk 124, LaGuardia Airport, 11:15 p.m.
June 14, 2004    Social security number xxx-xx-3909 referenced in credit report issued by Equifax to Ford Motor Co, 3:25 a.m.
June 28, 2004    Maryland driver license xxxx4779 presented at ABC Liquor Store, Salinas, CA, 10:35 p.m.
June 29, 2004    Maryland driver license xxxx4779 referenced in credit card application 442-1523-2291 processed by Third National Bank, Dover, DE, at 11:18 a.m.
June 29, 2004    Maryland driver license xxxx4779 presented at Public Entrance #2, U.S. District Court for Northern California, 235 Pine Street, San Francisco, CA, 2:20 p.m.
June 30, 2004    U.S. Passport xxxx3412 presented at Federal Passport Control, Terminal 3, LaGuardia Airport, 8:45 a.m.

SUMMARY REPORT FOR JUNE, 2004
*For John Q. Public*

Fidelity Investments

| | | |
|---|---|---|
| June 4, 2004 | Purchased 100 DMRC @ $11.25 ea | $1,125.00 |
| June 30, 2004 | Month end account value | $276,946.44 |

Bank of America

Mortgage

| | | |
|---|---|---|
| June 15, 2004 | Payment received | $1,175.00 |
| June 30, 2004 | Balance owing | $138,733.93 |

Savings

| | | |
|---|---|---|
| June 30, 2004 | Interest | $10.44 |
| June 30, 2004 | Month end account value | $12,355.22 |

Identity Document Usage

| | |
|---|---|
| June 11, 2004 | Maryland driver license xxxx4779 presented at United check-in, desk 14, Portland International Airport, 1:53 p.m. |
| June 11, 2004 | U.S. Passport xxxxxxxxxx3412 presented at United check-in, desk 124, LaGuardia Airport, 11:15 p.m. |
| June 14, 2004 | Social security number xxx-xx-3909 referenced in credit report issued by Equifax to Ford Motor Co, 3:25 a.m. |
| June 28, 2004 | Maryland driver license xxxx4779 presented at ABC Liquor Store, Salinas, CA, 10:35 p.m. |
| June 29, 2004 | Maryland driver license xxxx4779 referenced in credit card application 442-1523-2291 processed by Third National Bank, Dover, DE, at 11:18 a.m. |
| June 29, 2004 | Maryland driver license xxxx4779 presented at Public Entrance #2, U.S. District Court for Northern California, 235 Pine Street, San Francisco, CA, 2:20 p.m. |
| June 30, 2004 | U.S. Passport xxxx3412 presented at Federal Passport Control, Terminal 3, LaGuardia Airport, 8:45 a.m. |

FIG. 1

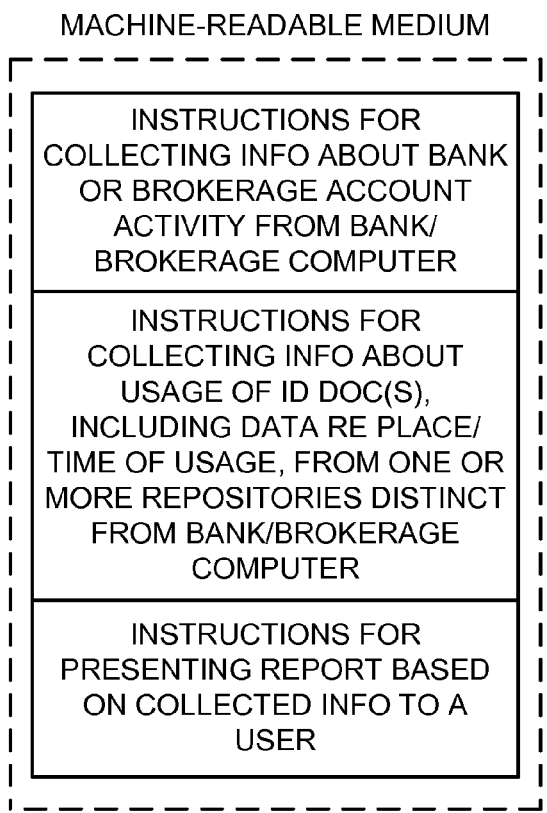

US 7,314,162 B2

METHOD AND SYSTEM FOR REPORTING IDENTITY DOCUMENT USAGE

RELATED APPLICATION DATA

This application claims priority to provisional application 60/516,581, filed Oct. 30, 2003.

This application is also a continuation in part of copending application 10/965,232, filed Oct. 13, 2004 (published as US 20050116025) which claims priority to provisional application 60/512,033, filed Oct. 17, 2003.

These applications are incorporated herein by reference.

BACKGROUND OF THE INVENTION

Driver's licenses are widely used as proof of identity. With the increase in identity theft, there is a need to enhance the reliability of driver's licenses as an identity proof.

Various arrangements for enhancing the reliability of driver's licenses are detailed in the priority applications, and recounted below.

A further way of enhancing the reliability of driver's licenses is to provide a driver with periodic reports of the contexts in which his/her license was presented as a form of ID. Upon receiving a report of unfamiliar driver's license usage (e.g., a report that the driver's license was presented as age verification in an alcohol purchase in a remote state), the person can be alerted that a fraud is underway, and can take steps to mitigate the resulting damage.

The foregoing and other features and advantages of the invention will be more readily apparent from the following detailed description, which proceeds with reference to the accompanying drawings.

BRIEF DESCRIPTION OF THE DRAWINGS

FIG. 1 shows a report of identity document usage according to an exemplary embodiment of the invention.

FIGS. 2-8 illustrate some of the arrangements detailed herein.

DETAILED DESCRIPTION

Figure 2:
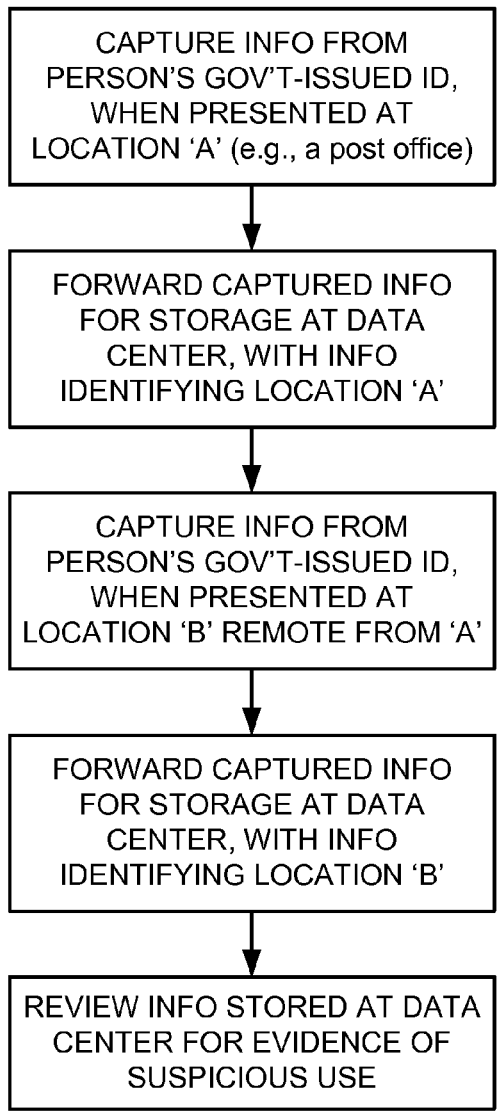

Prior to issuance of a driver's license, state officials (e.g., field agents in the state's Department of Motor Vehicles (DMV)) typically require production of two or three identification documents ("collateral" documents). Some states require that at least one of these documents provide some evidence of the applicant's age. Different jurisdictions have different requirements as to the type and number of collateral identification documents needed. Acceptable documents in one exemplary state include (but are not limited to):

1. Original or certified copy of birth certificate;
2. Military or armed forces ID card;
3. Military discharge papers;
4. Selective service registration card;
5. U.S. Passport;
6. Non-U.S. Passport;
7. Alien registration card;
8. Immigration or naturalization documents;
9. Adoption decree or adoption certificate issued by a court;
10. Canadian driver's license, instruction permit, or identification card;
11. Out-of-state driver's license, instruction permit, or identification card;
12. Department of Corrections age and identity letter (with photo);
13. Department of Corrections inmate identification card;
14. Mexican consular ID card;
15. Student body ID card;
16. Social Security card;
17. Vehicle title or registration;
18. Company identification card;
19. Pistol or firearms permit;
20. Liquor Control service permit;
21. Personalized check/statement, or savings account passbook;
22. Driver license renewal reminder;
23. Voter registration card;
24. Property tax statement;
25. W-2 tax form;
26. Medical or health card;
27. Department of Corrections release letter;
28. Parole papers;
29. Certified copy of school transcript;
30. Pilot's license;
31. Court papers or court orders, such as legal name changes;
32. Affidavit of identity by parent.

(Items 1-14 are accepted as proof of age.)

To applicant's knowledge, there has been no systematic study concerning patterns of use of collateral documents presented at the time of enrollment.

In accordance with one aspect of the invention, information is gathered concerning documents presented at the time of enrollment, and this data is later analyzed to determine which documents are most frequently (and/or most rarely) correlated with fraud in the enrollment process.

Fraud in the enrollment process may be detected at various times, including during attempted enrollment (e.g., through automated or manual checking conducted before the license is issued to the applicant), or later (e.g., through a police arrest of an individual found to be carrying multiple driver's licenses with the same photo but different names).

In one particular embodiment, relevant information is collected in a database, including identification of collateral documents presented during enrollment, and whether fraud has been associated with the license. As the database grows, increasingly accurate analyses can be performed to match certain collateral documents to fraud (or to certain types of fraud).

One type of analysis is correlation. A given enrollment document can be checked for its incidence of involvement in fraudulent and non-fraudulent license procurements. If the incidence for a particular type of collateral document deviates from the mean, use of that document can be regarded as being indicative of a higher, or lower, than normal possibility of fraud.

Consider a database of 10 million driver license records, with an overall fraud rate of 0.1%. Licenses for which a U.S. passport is presented as a collateral document may have an overall fraud rate of 0.02%, whereas licenses for which a student ID is presented as collateral may have an overall fraud rate of 1%. The passport evidently has a relatively strong negative correlation with fraud, whereas the student ID has a relatively strong positive correlation.

The example just given is a relatively simple one. Much more sophisticated analyses can be conducted.

One class of powerful analysis techniques is known as factor analysis. Such techniques consider a broad range of input variables, and assess their contributions (both individually and in conjunction with other input variables) to different results (e.g., incidence of fraudulent licenses, and arrests for speeding). (A number of books treat the subject in depth. A popular text is Kim et al, "Factor Analysis," Sage Publications, 1979.)

By applying factor analysis, outcomes contrary to the results given above may be discovered. For example, factor analysis may reveal that U.S. passports are positively correlated with fraud, if presented with a naturalization certificate as a companion collateral document. Likewise, student IDs may be found to be negatively correlated with fraud, if accompanied by an affidavit of an accompanying parent.

Factor analysis is an exercise in matrix mathematics and statistics. Another analytic technique relies on neural networks and so-called "fuzzy logic." These techniques look for patterns in data that might look random on casual inspection.

The foregoing techniques, and others, are used in the field of "data mining," for which many different software tools are available. The artisan is presumed to be familiar with such art.

The results of such analyses can be used in various ways. In one, state employees who issue driver's licenses are provided with the results, and instructed to spend relatively more or less time questioning an applicant depending on whether the collateral documents suggest (or not) an increased likelihood of fraud. Thus, personnel resources are thus deployed in a manner giving them a heightened fraud-fighting effect—with more of their time spent on cases where fraud is more likely.

The employees can be provided with the result data in tabular form (e.g., a listing of collateral documents that may trigger more or less scrutiny of an applicant), or the employee can be guided by a computer tool. In this latter arrangement, the user interface through which the employee annotates the DMV database record with information about the collateral documents used, can respond to the employee—based on the particular pair (or triple) of documents offered—and offer guidance as to actions the employee should, or needn't, take. Such arrangements may be regarded as expert systems—with expertise in reducing issuance of fraudulent licenses.

In one embodiment, the computer system computes a score that ranks the applicant, based on the forms of collateral ID produced. (As noted below, other variables may also factor into this computation.) The score thus serves as a figure of merit for the reliability of the collateral identification, on which different actions can depend.

Consider a scoring system that yields an average value of 100, with higher reliability scores indicating less likelihood of fraud. Persons scoring between 95 and 105 may be given a regular degree of scrutiny. Persons scoring less than 95 may be given progressively increasing amounts of scrutiny.

For example, if the collateral documents indicate a reliability score of 93, the DMV official may seek to corroborate identity by a fast, inexpensive, check. An example may be consulting a telephone directory database, to confirm that the name and address given to the DMV are consistent with information maintained by the local telephone company in their service records.

If the reliability score is 90 or less, the DMV official may seek to corroborate identity by a slower, perhaps more expensive check. For example, the official may solicit the applicant's social security number (if this isn't routinely provided as part of the enrollment process). When typed by the official into the DMV computer system, the system can check a federal social security database to confirm that a person by applicant's name was issued that social security number.

For a score of 87 or less, both the telephone directory and social security check may be utilized.

For a score of 84 or less, a still more rigorous check may be performed. For example, identifying information (e.g., name, address, social security number) can be passed to credit reporting agency, which responds with a credit report or credit score (e.g., FICO, an acronym for Fair Isaac & Company). This report is examined for consistency with the identifying information provided to the DMV official.

For a score of 81 or less, the foregoing checks may all be conducted and, in addition, the person's identifying information may be checked against local, state, and/or federal law enforcement databases.

(The scoring thresholds at which more rigorous verification is undertaken are, in the examples above, uniformly-spaced scores. More likely, these would be statistically-based brackets, e.g., based on standard deviation.)

These verification checks noted above needn't be manually initiated or conducted by the DMV employee; they can be undertaken automatically by a computer system. In some cases, the reliability score that triggers the checks isn't even provided to the DMV employee.

The foregoing are just a few examples of a great many verification procedures that may be performed. Some verification procedures may be tied to the particular forms of collateral identification offered by the applicant.

For example, if a military discharge certificate is offered, the DMV computer may consult with a federal database containing military service records to confirm that a person with applicant's name and birth date served in the military. (If additional data is captured from the collateral document—such as the discharge date—this information can be checked, also, against the military database.)

Likewise, if a W-2 tax form is presented, applicant's employment with the stated employer can be checked through on-line employment-reporting databases, such as a credit reporting bureau. (Again, to fully exploit such resources, it may be desirable to capture information from the collateral documents other than confirming applicant's name, and optionally address. In the W-2 case, the name of the employer could be captured and logged in the DMV database record, and used as an additional item for verification.) Or, more simply, an on-line check can be performed to confirm that the company listed on the W-2 has a presence within a given radius of the applicant's stated home address.

If the applicant passes the applicable verification checks, the license may be issued in the normal way. If one or more checks gives anomalous or conflicting results, different action may be taken.

If the telephone directory search reveals no listing, the applicant may plausibly explain that they just moved into the jurisdiction and don't yet have telephone service. In such case, the protocol may involve attempting a different form of verification, such as the social security number check. Or the protocol may require the DMV official to solicit a third (or fourth) item of acceptable identification. A new reliability score can then be determined based on the enlarged set of collateral documents. If it still falls below 95, other checks can be run (e.g., the social security database check). If such other check(s) gives no cause for further suspicion, the driver's license can be issued in the normal course.

Some verifications may suggest that a fraud is being attempted, or that a crime has been committed. For example, consider an applicant who presents a savings account passbook as an element of identification. If the expert system—on considering the ensemble of proffered collateral documents—determines a reliability score of less than 90, the system may suggest that the official check (or the computer may itself check) with the issuing bank to confirm that the passbook is valid. On checking its records, the bank may report that the passbook was stolen during a house break-in.

Such a circumstance can trigger different responses. One is for the DMV official to advise the applicant that the computer system has flagged the application for further screening, and invite the applicant to return to the DMV office on the next business day to complete the process. (Optionally, the official may be requested to surreptitiously observe the applicant's vehicle as they depart the parking lot, and enter a description of the vehicle and/or license plate information.) Another response is to electronically send an alert to an appropriate law enforcement official while the person is at the counter, or to send the complete dossier of information collected from the applicant (either in real-time or later, e.g., overnight).

Another response is to issue a license. Although counter-intuitive, this step may be desirable from a law enforcement standpoint, e.g., transforming an attempted fraudulent procurement of a license into an actual fraudulent procurement offense. The issued license may be marked so as to indicate, to authorized inspectors such as law enforcement, that is it suspect (e.g., a different color background may be printed behind the facial portrait, or a bar code or watermark formed on the license may convey such an alert, etc). Or a conventional license may be issued, and remedial steps can be taken later to recover same (e.g., seizure, at the time of arrest for the suspected offense).

Other responses, and combinations of responses, can of course be used.

Naturally, frauds discovered through such checking in the enrollment process should be logged in the database so as to enhance the information on which the expert system decisions are based.

In some embodiments, frauds noted in the database may be given a confidence score. A fraud that is established through a court decision may be given a high confidence score. A fraud that is suspected but never verified (e.g., ambiguous verification results, with the applicant asked to return the next day but never returning) may be given a lower confidence score. Again, this confidence measure is another variable that can figure into the expert system data analysis.

Desirably, a rich set of data relating to each examination/verification procedure is collected and added to the DMV database. This information will allow even more accurate reliability scoring to be determined in the future. That is, the reliability scoring can be based not just on the two or three types of collateral identification documents presented at the time of application, but can also be a function of the results of various verification procedures. And over the course of months, as reports of fraud are added to the database, the relevance of certain verification factors can change from obscure to clear.

With sufficient experience, for example, the expert system may discern that certain verification check results—in combination with certain other circumstances (e.g., in combination with certain types of collateral documents)—may substantially change the statistical likelihood of fraud. Consider the applicant with an initial reliability score (based on the collateral documents alone) of 93. A telephone directory check is made. The check does not confirm applicant's information. The failure of this check can now be added into the set of data on which the system computes the score, yielding a modified score. The modified score—since it is a function of a richer set of input variables—permits more accurate categorization of the fraud risk.

Based on analysis of historical data, for example, the system may advise that failure of the telephone directory check changed the applicant's score from a 93 to an 84. This steep drop in score may be because the applicant used a corporate ID and a vehicle registration as collateral IDs, and these have historically been found to be associated with fraud in contexts where the telephone directory check is failed. (In contrast, if the applicant presented a pilot's license and a U.S. passport as collateral documents, the score might have only fallen to a 91, again based on historical patterns of experience.)

Thus, results from verification checks can be used as additional factors in assessing fraud risk.

Still other factors can be introduced into the assessment. One is credit history or scoring (e.g., FICO score). In the enrollment process, the DMV system may automatically solicit a FICO score from one or more of the credit reporting agencies (e.g., Equifax, Experian, TransUnion). If historical data stored in the DMV database includes such information for a meaningful number of prior applicants, the role of such a score as a factor in fraud can be determined, and used in establishing a reliability score for the application. (If the historical data is insufficient to do a rigorous analysis, then the FICO score might be used as a simple "plus" or "minus" factor. Thus, the reliability score of an applicant with a FICO score of more than 700 (on a scale extending to 850) may be increased by 2. The score of an applicant with a FICO score of below 450 may be decreased by 2.)

Another factor that can be included in assessing the reliability score is the applicant's age. Historical data compiled in the database may establish that applicants of different ages have different incidences of fraud. Again, the role of age as a factor in fraud can be mined from the data, and used as another variable in determining the reliability score. (Or, again, it can serve as a simple "plus" or "minus" factor, e.g., if the applicant is below 23 years old, his score is reduced by 2; if between 23 and 26 his score is reduced by 1; if over 70 his score is increased by 3; if over 80 his score is increased by 5.)

Many other factors may also be utilized in such systems, subject to applicable legal considerations. These may include gender, zip code, type or model year of car, birthplace, marital status, etc., etc.

Over time, a large set of data will be available in the data sources that are consulted to compute a reliability score (i.e., both the fraud database, and the ancillary verification sources). To further increase accuracy, trends in the data over time can be used in rendering the expert advice. For example, the Mexican consular card may have a relatively high historical incidence of fraud associated with it. However, further analysis may show that such fraud has dropped steeply in the past 9 months (e.g., due to redesign of the card, or re-working of the procedures for its issuance). Thus, in assessing risk, the historical high risk may be tempered with the better, recent, experience.

This trend analysis can be performed in various ways. One is to assess the data patterns over different periods to discern any notable variance. Thus, incidence of fraud may be computed over the life of the database (e.g., 0.2%), over the past two years (e.g., 0.1%), and over the past six months (e.g., 0.04%). Given these substantially different figures, the system can recognize that there is a shift underway in the statistics associated with this variable. Thus, the system may depart from its usual protocol (e.g., using data from the past 2 years), and instead use the average of the 2 year and the 6 month statistics (i.e., 0.07% in the case just given).

In some cases, it may be appropriate to extrapolate a trend. This may be particularly prudent in cases where the risk appears to be rising. Since the information in the database is necessarily from the past, a more accurate assessment of the current risk may be obtained by determining a trend curve, and estimating the current incidence of fraud by reference to that trend.

Consider a collateral document having fraud incidences over different window periods as follows:

| Data Window | Fraud Incidence |
| --- | --- |
| 12-9 months ago | 0.1% |
| 9-6 months ago | 0.13% |
| 6-3 months ago | 0.17% |
| 3 months ago-current | 0.22% |

Analysis of this data shows an exponential growth of about 30% per quarter. This figure can be applied to the historical data to obtain an estimate of the risk today.

For example, the mid-point of the most recent quarterly window is 1.5 months ago. Applying 1.5 months of 30% quarterly growth to the 0.22% figure from the most recent quarter yields an estimate of 0.25% today.

(More sophisticated analytic techniques take into account that the fraud data for the most current quarter is likely less comprehensive than that from successively older quarters, since less time has elapsed for fraud after issuance to be discovered and recorded (e.g., police stops and arrests). Thus, other techniques can apply trend analysis using a data confidence measure—relying more heavily on the data that has more indicia of reliability.)

The foregoing procedures were described in the context of over the counter issuance systems. Additional flexibility is available in central issue systems, since there is more time available to conduct verification checks.

In a central issue system, the expert system can consider the applicant over a period spanning hours or days. Many of the steps of the process may be performed at night, when database and bandwidth connection charges may be reduced. With the luxury of increased time, more comprehensive checking can be undertaken. Again, each check provides more data by which the applicant's reliability score can be further refined. If the process requires additional material from the applicant (e.g., a further piece of collateral identification), a letter can be mailed soliciting the information. Or a telephone solicitation can be made—either automated or by a human operator.

The database containing fraud data, which is mined as described above, needn't be limited to a single state. A larger sample set, and higher reliability results, may be obtained by using data from several states. This data can be assembled in a single database. Alternatively, several separate databases may be maintained, and consulted individually for the information needed for the analysis.

In some arrangements the reliability scoring can be performed by a public agency, such as a state department of motor vehicles. In others, the scoring can be performed by a private company—much like credit scores calculated by credit bureaus.

One use to which the accumulated fraud data can be put is legislative: changing the list of documents approved to establish identification. For example, legislative review of historical data may indicate that—of the earlier-listed 32 documents acceptable to establish identity—two have much higher incidences of associated fraud than any of the others. Accordingly, the legislature may decide to amend the list of acceptable documents to remove those two apparently less reliable documents.

Again, the aim should be continuous improvement—using the richer data that accumulates over time to perform more discerning analyses in the service of fraud reduction.

In addition to changing the list of acceptable documents, other changes can also be made in response to patterns discerned in the collected data. One is to enact countermeasures targeting certain high-incidence types of frauds. Consider frauds involving licenses that have been fraudulently produced or altered (as opposed, e.g., to frauds involving officially-issued documents, but based on false identities). Such fraudulent production or alteration may be of several types, e.g., photo-swapping in an officially-issued license; altering text on an officially-issued license; fraudulently printing a license using a home ink-jet printer, etc. Desirably, the fraud-tracking database has indexed fields by which such types of fraud can be separately identified. Review of historical data from such a database in one state may reveal that most such fraud is effected by photo-swapping. Data for another state may reveal that ink-jet counterfeiting is more common. As these patterns become evident, appropriate countermeasures can be implemented in design of the license. In the former case, a security laminate might be newly provided over the photograph—to make photo tampering more evident. In the latter case, fluorescent inks might be used—inks that are not commonly available for home ink jet printers.

The fraud database may also track different varieties of fraud involving licenses that are issued by the appropriate state agency and not tampered with. One may be the situation of several licenses being issued to the same person—with different names on each. Another may be licenses bearing incorrect birthdates (e.g., in reliance on altered collateral documents). If the former type of fraud is prevalent, an appropriate countermeasure can be deployed (e.g., face-matching the applicant's photo against a library of photos from all other licenses previously issued). If the latter type of fraud is prevalent, then more reliable age-establishing documents should be required, or more effort should be spent validating the birth date stated by the applicant.

Again, a theme is identifying what system weakness is being exploited the most, and then addressing it.

The examples given above are based on data that is accumulated slowly over time. However, related principles can be used in more dynamic contexts.

Consider a ticketing counter at an airport. Travelers may check-in for flights presenting driver's licenses from all 50 states, as well as from various foreign countries. Should the agent regard all as equally trustworthy?

Probably not. Historical data—if compiled in one or more databases—may indicate that licenses from some jurisdictions are more reliable than others. Many of the September 11 hijackers, for example, carried licenses from a certain state. The reliability of different jurisdictions' licenses may be determined by historical data collection and analysis techniques like that given above. If a license from, e.g., Oklahoma, scores as less reliable than a license from New Jersey, then the airline agent should probably spend more effort validating a traveler presenting an Oklahoma license than one presenting a New Jersey license.

Such a software system can also respond to fast-moving events. If a pallet of security consumables (e.g., a laminate with the state seal, micro-printed with a known batch number) is stolen from a DMV office in Mississippi, for example, there may soon be a deluge of authentic-looking forgeries of the Mississippi driver's license in circulation. An airline agent presented with a Mississippi license should probably give the traveler a bit more scrutiny.

Desirably, airline agents and others who rely on driver's licenses to establish identity should have available a software system that serves as a virtual expert to assist them. The agent would enter the jurisdiction of the presented license, and the software system would respond with relevant coaching. If a New Jersey license is presented, the system may offer no cautions. Or it may inform the agent that the NJ license is rarely suspect, but then highlight the circumstances that are seen in the few instances of reported fraud. If an Oklahoma license is presented, the expert system may suggest soliciting and checking a second piece of identification. If a Mississippi license is presented, the system may advise the agent of the recent news involving that license. The system may continue by suggesting how the license might be scrutinized to determine if the stolen laminate has been used (e.g., use a magnifying glass to read the micro-printed serial number, to see if it matches the stolen batch), or the system may simply suggest that a second piece of identification be solicited and checked.

As before, such software can help personnel allocate their efforts where they will be most effective in preventing fraud.

Another aspect of the present technology involves tracking the contexts in which a particular driver's license is used. For example, if a driver's license is presented as a form of identification by a person cashing a check in New York, and the same license is presented an hour later by a traveler checking in for a flight at Los Angeles International Airport, then something is amiss.

Desirably, a record is captured each time a license is presented in a commercial or identification transaction. The record may be generated in various ways. For example, the license can be imaged, and technology applied to read the data on the card (e.g., OCR can be used to "read" text and barcode data, while steganographically encoded data can be decoded by suitable image processing). The license could also be swiped through a reader that captured data from a magnetic stripe and/or optically encoded machine readable indicia on the card. Still further, text data may be OCRed from the card. Or a card identification number can be typed into a form, or OCRed from a form on which the identification number has been entered.

The license information—together with place and time of presentment—can be forwarded to a database. (Such data capture is similar to the familiar practice used with credit cards, where every use is logged as to place and time.)

It is possible that such data collection may be mandated by legislation, seeking to thereby enhance national security. Alternatively, the data collection can be voluntary, with incentives provided to those who capture such data (and/or to those who assent to such capture from their licenses).

To illustrate, legislation might require presentment and capturing of driver license data from persons mailing packages at the U.S. Post Offices and other parcel services. The President's Commission on the Unites States Postal Service has indicated a desire to be able to better track the origins of mailed parcels, e.g., to counter terrorism by mail.

On the incentive side, a vendor who captures license data from persons who pay a bill by check and offer a license as identification, may be given preferential commercial terms than a competing vendor who does not do so. Thus, the former merchant may have less liability for accepting bad checks (insufficient funds), or may be charged a lower monthly account fee by the bank.

Similarly, the person presenting the license may be rewarded for allowing automated data capture. (Manual data capture is already widely accepted, e.g., a supermarket clerk writing a driver's license number on a check.) Again, in the checking case, lower fees may be offered. Alternatively, small cash rewards or other premiums may be available.

Once captured, analyses may be performed as to usage patterns for driver's licenses. One outcome of such analysis is flagging inconsistent usage scenarios, such as the one noted above (i.e., physical presentment of the same license in New York and California within an hour). When such inconsistent usage is detected, a responsive action can be taken (such as denying boarding to an aircraft).

Data collected about license usage can be reported to the owner of the license. The database operator or another entity can provide this service directly. Or third parties can serve as intermediaries. For example, just as services such as Yahoo, Microsoft Money, and Intuit Quicken, can aggregate personal financial information from a variety of data sources, similar content aggregation software tools can likewise retrieve information from the database(s) that track presentation of driver's licenses. This information can be presented to the owner, e.g., in periodic reports, such as with monthly summaries of stock portfolio or bank account transactions, or in a stand-alone report.

FIG. 1 shows one form of presentation. Here the report starts with aggregated financial information, retrieved by the software from databases maintained by Fidelity Investments (brokerage account information) and Bank of America (mortgage account and savings account information; information about checking accounts, credit card accounts, etc., can likewise be included). The report details, e.g., transactions for the month and account balances. At the bottom is a record of identity document usage.

The first entry of the identity document part of the report show that John Q. Public's Maryland driver's license was presented to a United ticket agent at Portland International Airport on Jun. 11, 2004. (Part of the license number is printed as 'xxxx' to avoid recovery of sensitive information by dumpster diving and other such techniques.)

The next line shows that Mr. Public's U.S. passport was presented to a United airlines ticket agent at LaGuardia airport later on the same day.

On the next line is an entry showing that a credit report referencing the social security number of John Q. Public was issued by a credit reporting agency to Ford Motor Company on June 14. (The credit reporting agency may report all transactions listing a social security number to a data repository that tracks usage of social security numbers. Such reporting may be voluntary, or compulsory. Alternatively, the credit reporting agency may maintain its own data repository from which such information may be gleaned, in which case the data aggregation software that produced the FIG. 1 report could poll the agency's data repository for this information.)

The third entry shows use of Mr. Public's Maryland driver's license at a liquor store in Salinas California on June 28.

The following entry shows that Mr. Public's Maryland driver's license was referenced in a credit card application processed by a bank in Delaware. Again, such reporting of credit applications that list an identity document may be voluntary, or compulsory. And again, reports of such references can be compiled in a central database, or in a data repository maintained by the involved commercial entity and made accessible to the software which compiled the FIG. 1 report.

The second-to-last entry shows presentation of Mr. Public's Maryland driver's license at a checkpoint in the entrance to a San Francisco federal courthouse building.

The final entry shows presentation of Mr. Public's U.S. passport at a passport control station at LaGuardia airport on June 30.

(Although not illustrated in FIG. 1, any capturing of driver's license data by law enforcement, such as during a traffic stop, may also be reported to a data repository, and collected/reflected in the report of FIG. 1.)

When presented to Mr. Public, he may immediately recognize that he did not visit a liquor store in Salinas, Calif., nor apply for a Third National Bank credit card, nor enter a federal courthouse in San Francisco. Alerted by such information, Mr. Public can immediately inform his bank and other financial institutions of apparent identity theft, so that they can treat any transaction purporting to be conducted by Mr. Public as suspect, and requiring further verification.

Automated software tools can also infer suspicious activity. Presentation of a passport to an airlines ticket agent in New York on June 11, and presentation of the same passport to federal passport control authorities on June 30, can lead an automated tool to infer that Mr. Public was out of the country from June 11 to 30. Transactions during this period may be regarded as suspect. Indeed—any activity following presentation of a U.S. passport at an apparent departure from a U.S. airport, until the person presents the passport upon their return, can be regarded as suspicious. These may be flagged in the report, e.g., by distinctive color, typeface, warning icon, etc.

Software that periodically checks identity document usage can make these inferences, and take appropriate steps to alert the person, or to alert financial institutions where the person has accounts. In some arrangements, each time a report of ID document usage is sent to a data collection repository, a check is made to ensure that no suspicious circumstance or pattern is evident. If so, a report can immediately be sent back to the entity where the most recent ID presentment—the one that triggered the finding of suspiciousness—occurred. Other mitigating steps can also be taken, as appropriate.

Published US patent applications 20020049727 and 20020013850 detail content aggregation technologies suitable for collecting information from disparate data sources, and for presenting the collected information in an integrated fashion. As noted, this information can be presented in summaries of account information presented by Microsoft Money, Quicken, Yahoo!, etc.

In other arrangements, each time presentment of a driver's license (or other identity document) is reported, a corresponding report can be immediately sent to the proprietor of the license, e.g., by email, text messaging, voice mail, etc. Such messages would usually not be so frequent as to be burdensome, yet would provide timely notice of trouble. Software for issuing such alerts can be an adjunct to the database software: each time the database is sent a new presentment report, this software can dispatch an alert to the corresponding user.

The data repositories used in the foregoing arrangements can be maintained by individual state departments of motor vehicles, and/or a central repository can collect information for several (or all) driver license issuing jurisdictions. Likewise, a separate repository can collect information about presentments of U.S. passports, and/or this information can be collected in a centralized repository—together with information about other types of identification documents.

Figure 3:
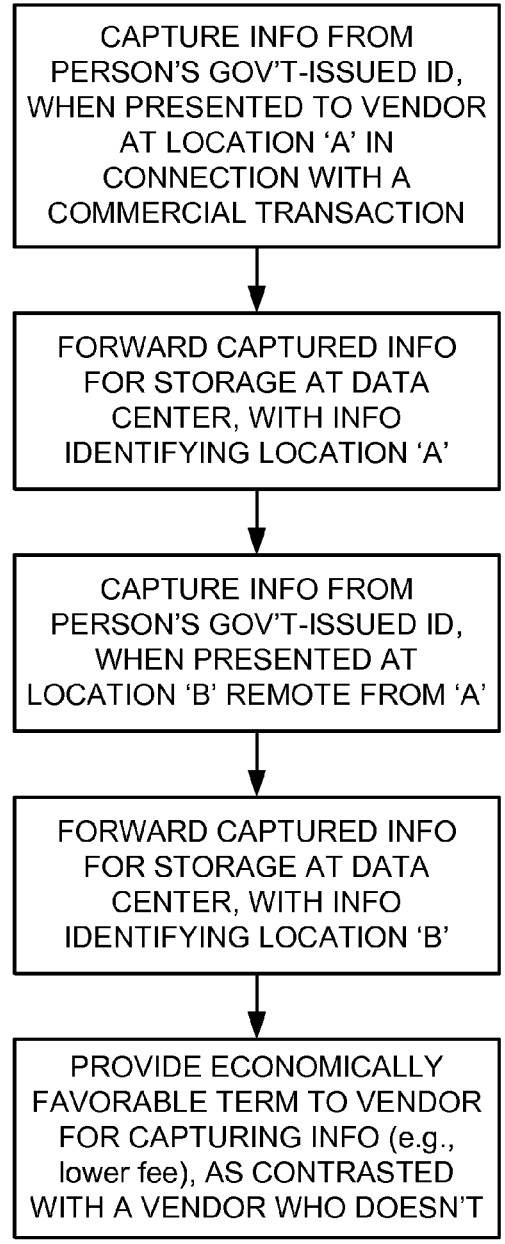
Figure 4:
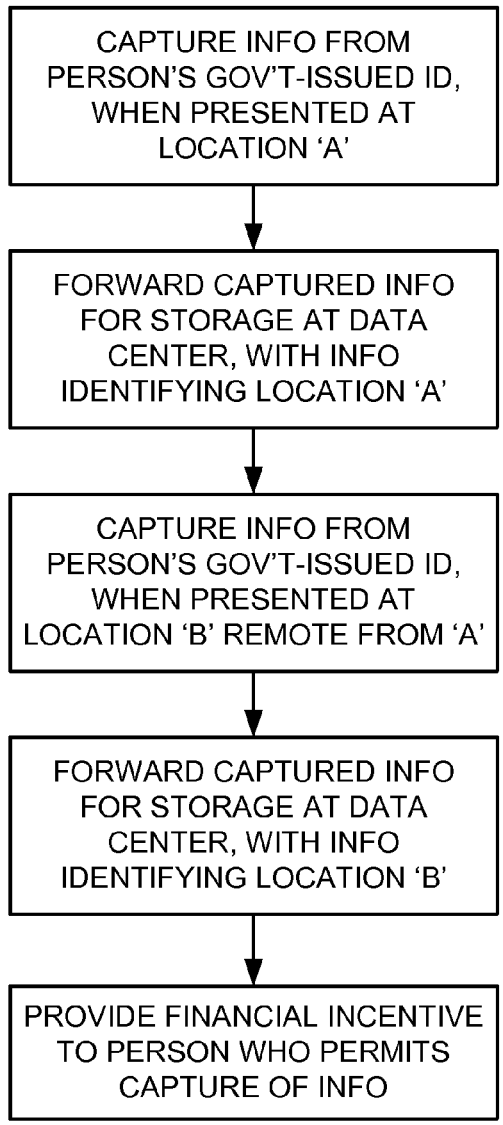
Figure 5:
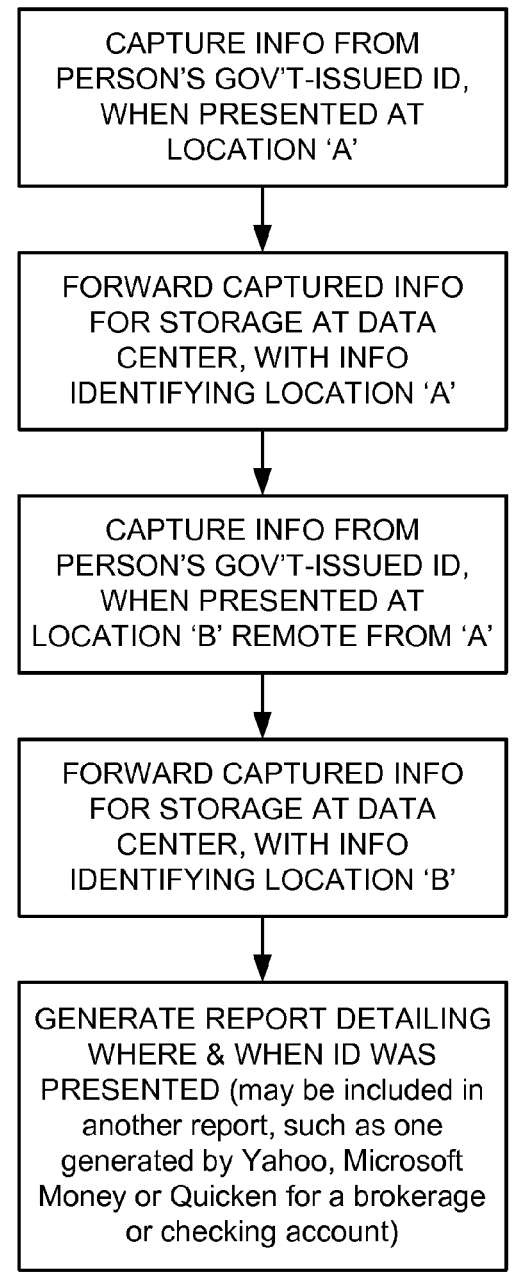

FIGS. 2-8 illustrate some of the above-described arrangements.

Concluding Remarks

Pending application 10/370,421 (published as US 20040049401) includes a variety of teachings relevant in combination with the present disclosure. One concerns on-line renewal of driver's licenses.

Likewise, pending applications 60/418,129 and 60/429,501 detail biometric technologies for combating fraud in driver's license issuance, including searching image collections for duplicate facial images.

Reference has been made to driver's licenses and state authorities. However, it will be recognized that the technology isn't so limited. Other articles of identification (e.g., social security cards, passports, etc.) can be made more secure by the methods described above. And the issuers of the identification needn't be states—they can be other jurisdictions or entities, public or private.

Analytic techniques other than those noted above can also be employed. A predictive modeling technique used to detect cell phone fraud is detailed in U.S. Pat. No. 6,597,775, and its teachings can likewise be applied to detect fraudulent use of driver's licenses or other identity document. Similarly, U.S. Pat. No. 6,513,018 details a system for scoring the likelihood of a result, and such technology can be applied in generating reliability scores of the sort detailed above.

Although not particularly illustrated, it will be recognized that the methods described above can be implemented using general purpose (or special purpose) computers, e.g., comprising one or more CPUs, semiconductor memory, hard disks, networking connections, and input-output devices, as are conventional in the art. Software instructions for implementing the above-detailed methods can be stored on tangible media associated with such systems, e.g., disks and semiconductor memories.

To provide a comprehensive disclosure without unduly lengthening this specification, the patents and applications cited above are incorporated herein by reference.

We claim

1. A method comprising:
    capturing information from a government-issued identification document for a person, when the document is presented at a first location;
    forwarding information captured from the document for storage at a first data center, together with information identifying the first location;
    capturing information from a government-issued identification document for said same person, when the document is presented at a second location remote from the first location;
    forwarding information captured from the document for storage at a second data center, together with information identifying the second location; and
    reviewing information stored at the first and second data centers for evidence of suspicious use.

2. The method of claim 1 wherein legislation requires presentment of a government-issued identification document from persons mailing packages at U.S Post Offices, and one of said first or second locations is a U.S. Post Office.

3. The method of claim 1 wherein a vendor who captures information from a government-issued identification document during a commercial transaction is given economically favorable commercial terms, compared to a vendor who does not capture such information.

4. The method of claim 1 wherein the capturing of information at the first location is performed by a vendor, and the vendor is charged a lower fee by a financial institution because of said information capturing.

5. The method of claim 1 wherein the person is provided a financial incentive for permitting capturing of information from the government-issued identification document.

6. The method of claim 1 wherein the first and second data centers are the same data center.

7. The method of claim 1 that further comprises generating a report detailing where and when wherein the government-issued identification document was presented, and presenting said report to said person.

8. The method of claim 1 in which said report also reports activity relating to a brokerage, savings, mortgage, or checking account maintained by the person.

9. A method comprising the acts:
collecting information about bank or brokerage account activity from a bank or brokerage computer;
collecting information about usage of one or more government-issued identity documents from one or more data repositories distinct from said bank or brokerage computer, said information including data relating to place and time of said usage; and
presenting a report based on the collected information to a user.

10. The method of claim 9 that includes flagging at least one of said usages as suspicious, and highlighting the report of same in a visibly conspicuous manner.

11. A method comprising:
collecting information relating to presentment of a person's driver's license in first and second different contexts;
checking, by reference to presentment of said license in said first and second different contexts, if there is potentially suspicious usage of said license; and
if so, alerting a party to said potentially suspicious usage.

12. The method of claim 11 wherein said party is a financial institution with which said person has an account.

13. A method comprising:
capturing information from a government-issued identification document for a person, when the document is presented at a first location;
reporting said capture to a remote data center; and
alerting the person concerning said presentment, the alerting including providing data identifying the first location.

14. The method of claim 13 that includes alerting by at least one of: email, text messaging, or voice mail.

15. The method of claim 13 that includes collecting information concerning financial transactions relating to said person, and reporting said presentment with said collected information.

16. The method of claim 13 that includes aggregating information concerning financial transactions relating to said person from several parties, and reporting said presentment with said aggregated information.

17. The method of claim 13 that includes:
capturing information from said document when presented at a second location distinct from the first;
determining whether presentment of said document at the second location gives rise to suspicion, taking into account earlier presentment of the document at the first location; and, if so;
reporting possible misuse of said document.

18. The method of claim 17 that includes reporting said possible misuse to an entity at the second location.

* * * * *